US008973860B2

(12) United States Patent
Beard

(10) Patent No.: US 8,973,860 B2
(45) Date of Patent: Mar. 10, 2015

(54) AERIAL RECOVERY OF SMALL AND MICRO AIR VEHICLES

(71) Applicant: Brigham Young University, Provo, UT (US)

(72) Inventor: Randal W. Beard, Provo, UT (US)

(73) Assignee: Brigham Young University, Provo, UT (US)

(*) Notice: Subject to any disclaimer, the term of this patent is extended or adjusted under 35 U.S.C. 154(b) by 0 days.

(21) Appl. No.: 13/663,791

(22) Filed: Oct. 30, 2012

(65) Prior Publication Data

US 2014/0008490 A1    Jan. 9, 2014

Related U.S. Application Data

(62) Division of application No. 12/487,907, filed on Jun. 19, 2009, now abandoned.

(60) Provisional application No. 61/132,646, filed on Jun. 20, 2008.

(51) Int. Cl.
*B64D 3/00* (2006.01)
*B64C 39/02* (2006.01)

(52) U.S. Cl.
CPC ............... *B64D 3/00* (2013.01); *B64C 39/028* (2013.01); *B64C 2201/028* (2013.01)
USPC .................................... 244/1 TD; 244/110 C

(58) Field of Classification Search
USPC ............... 244/1 TD, 110 F, 110 C, 114 R, 63
See application file for complete search history.

(56) References Cited

U.S. PATENT DOCUMENTS

| | | | | |
|---|---|---|---|---|
| 3,207,480 A | * | 9/1965 | Fulton, Jr. ..................... | 258/1.2 |
| 3,389,880 A | * | 6/1968 | Ferguson .................... | 244/137.1 |
| 4,790,497 A | * | 12/1988 | Yoffe ............................ | 244/115 |
| 5,088,663 A | * | 2/1992 | Henson ...................... | 244/137.1 |
| 6,824,102 B2 | * | 11/2004 | Haggard ..................... | 244/110 F |
| 6,994,294 B2 | * | 2/2006 | Saggio et al. .............. | 244/135 A |

OTHER PUBLICATIONS

Teledyn Ryan Aeronautical, Mini-RPV Recovery Conceptual Study, Aug. 1977.*

* cited by examiner

*Primary Examiner* — Timothy D Collins
*Assistant Examiner* — Jamie S Stehle
(74) *Attorney, Agent, or Firm* — Austin Rapp & Hardman

(57) ABSTRACT

A method, apparatus, system, and computer system to facilitate aerial recovery of an air vehicle are disclosed. In various embodiments, a drogue is established in a drogue recovery orbit and an air vehicle is recovered with the drogue. Establishment of the drogue in a drogue recovery orbit may include establishment of a mothership in a mothership recovery orbit or actuating control surfaces on the drogue. Recovering the air vehicle may include maneuvering the drogue and the air vehicle in a cooperative manner to facilitate recovery of the air vehicle or utilizing a homing device on the drogue to guide the air vehicle. The various techniques disclosed may be modified to compensate for wind.

5 Claims, 4 Drawing Sheets

AERIAL RECOVERY OF SMALL AND MICRO AIR VEHICLES

RELATED APPLICATIONS

This application is a divisional of U.S. application Ser. No. 12/487,907, filed Jun. 19, 2009, which claims the benefit of U.S. Provisional Application No. 61/132,646, filed Jun. 20, 2008, which is incorporated herein by reference.

TECHNICAL FIELD

The present disclosure relates generally to unmanned aerial vehicles. More specifically, the present disclosure relates to aerial recovery of small and micro unmanned aerial vehicles.

BACKGROUND

Due to recent directives from the Department of Defense, there is great pressure to develop the technology behind unmanned aerial vehicles (UAVs). UAVs are remotely piloted or autonomous aircraft that can carry cameras, sensors, communications equipment, or other payloads.

UAVs have proven their usefulness in military applications in recent years. Large UAVs have become an integral part of the U.S. arsenal. Large UAVs have executed surveillance and tactical missions in virtually every part of the world. For example, unmanned aircraft systems ("UAS") have become an essential tool for warfighters. While high-altitude, long-endurance UAS like the Predator and the Global Hawk provide persistent intelligence, surveillance, and reconnaissance ("ISR") capabilities, they are a scarce resource that cannot be given specific data-gathering tasks by individual troops. At the other end of the spectrum are backpackable small and micro air vehicles ("MAVs"), with wingspans less than 48 inches, which theoretically can be carried by every warfighter.

One drawback of MAVs is the recovery of the MAV after it has completed its mission. Although the relatively low cost of MAVs may suggest that they may be expendable (and thereby removing the need for recovery), MAVs still contain critical and often classified technology that needs to be kept out of enemy hands. Thus, innovative recovery techniques are critical to ubiquitous use of MAV technology.

DETAILED DESCRIPTION

Figure 1:
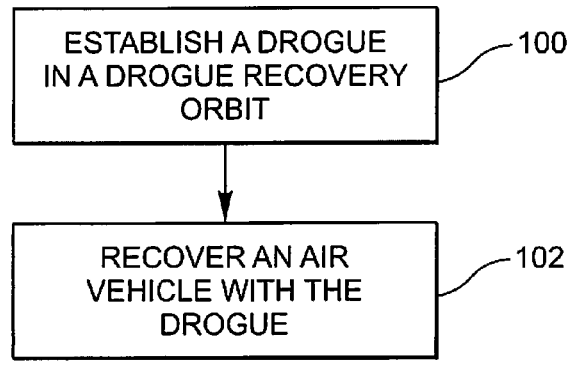
FIG. 1 is a flow diagram illustrating an embodiment of a method of recovering an air vehicle.

The word "exemplary" is used herein to mean "serving as an example, instance, or illustration." Any embodiment described herein as "exemplary" is not necessarily to be construed as preferred or advantageous over other embodiments. In addition, references to "an," "one," "other," "another," "the," "this," "alternative," or "various" embodiments should not be construed as limiting since various aspects of the disclosed embodiments may be used interchangeably within other embodiments.

A method, apparatus, system, and computer system are disclosed to facilitate aerial recovery of an air vehicle (e.g., MAV). One embodiment of the method may include establishing a drogue in a drogue recovery orbit and recovering an air vehicle with the drogue. In various embodiments, one or more of the following may also be part of the method: establishing a mothership in a mothership recovery orbit; actuating one or more control surfaces of the drogue; maneuvering the drogue and the air vehicle in a cooperative manner to facilitate recovery of the air vehicle; utilizing a homing device on the drogue to guide the air vehicle; and compensating for wind.

One embodiment of the apparatus (e.g., drogue) may include an aerodynamic main body portion, at least one control surface located on the main body portion, a catch mechanism coupled to the main body portion, the catch mechanism to facilitate recovery of an air vehicle, and a homing device coupled to the main body portion to guide the air vehicle during recovery. The apparatus may also include an attachment mechanism to attach the main body portion to a mothership with a tow cable. In various embodiments, the catch mechanism may comprise at least one of an open cavity located within an interior of the main body portion, a closeable cavity located within the interior of the main body portion, and a dragnet coupled to the main body portion. In various embodiments, the homing device may comprise at least one of a color marker, an infrared marker, an acoustic beacon, and an electromagnetic beacon.

One embodiment of the system may include a mothership and a drogue coupled to the mothership by a tow cable, the drogue comprising an aerodynamic main body portion, at least one control surface located on the main body portion, a catch mechanism coupled to the main body portion, the catch mechanism to facilitate recovery of an air vehicle, and a homing device coupled to the main body portion to guide the air vehicle during recovery. In various embodiments, the catch mechanism may comprise at least one of an open cavity located within an interior of the main body portion, a closeable cavity located within the interior of the main body portion, and a dragnet coupled to the main body portion. In various embodiments, the homing device may comprise at least one of a color marker, an infrared marker, an acoustic beacon, and an electromagnetic beacon.

One embodiment of the computer system may include a processor, memory in electronic communication with the processor, and instructions stored in the memory, the instructions being executable to establish a drogue in a drogue recovery orbit and recover an air vehicle with the drogue. In various embodiments, the computer system may control one or more elements of the system (e.g., mothership, drogue, air vehicle). In various embodiments, the memory may further include instructions being executable to perform one or more of the following: establishing a mothership in a mothership recovery orbit; actuating one or more control surfaces of the drogue; maneuvering the drogue and the air vehicle in a cooperative manner to facilitate recovery of the air vehicle; and compensating for wind.

Backpackable MAVs enable warfighters on the ground to gather time-critical, over-the-hill ISR information. However, retrieving the MAV is problematic because landing the vehicle near the soldier could disclose his/her location to an enemy. Another potential application of MAVs is collecting battle damage information. For example, the MAV could piggyback on munitions until several seconds before impact, when it is deployed so that it can circle the target to assess the damage caused by the munitions. Again for this application, retrieval of the MAV after it has performed its mission is difficult because target locations are often deep in enemy territory, and the MAV may not have enough fuel to return home.

A third potential application of MAV technology is to assist gunship operators to track and prosecute multiple targets. For example, enemy combatants may separate and flee in multiple directions when there is a threat of attack by a gunship. The gunship could potentially deploy multiple MAVs to assist in tracking the combatants as they flee. Yet again, it is difficult to retrieve the MAV after it has completed its mission, primarily because the airspeed of the gunship, which may be approximately 200 knots, is so much greater than the airspeed of the MAV, which may be approximately 30-40 knots. There are numerous other applications where MAVs could be used to safely gather high resolution ISR data but for which retrieval of the asset is problematic.

The primary difficulty with aerial recovery is the relative size and speed of the mothership compared to the MAV. Aerial recovery is much like aerial refueling where the goal is to extend the operational lifetime of the asset. However, in aerial refueling, the fighter jet and the tanker can match their airspeeds, which is not possible with MAVs and larger aircraft. The embodiments disclosed herein may facilitate aerial recovery of existing MAVs using a much larger fixed wing mothership. The mothership could either be unmanned (e.g., Predator) or manned (e.g., AC-130).

Referring now to FIG. 1, an embodiment of a method is shown. The method begins by establishing a drogue in a drogue recovery orbit at block 100. As used herein, a "drogue" refers to a device to be towed by an aircraft (e.g., mothership) to facilitate the recovery of an air vehicle (e.g., a small or micro air vehicle). In various embodiments, recovery of the air vehicle is conducted in the air (e.g., an aerial recovery). As used herein, a "drogue recovery orbit" refers to an orbit in which the drogue is established to facilitate recovery of an air vehicle.

In various embodiments, the drogue recovery orbit may be an orbit in which the drogue maintains substantially the same altitude while flying in a generally circular pattern. In other embodiments, the drogue recovery orbit may have patterns that are not circular. Thus, any shape orbit may be utilized to facilitate recovery of an air vehicle. Furthermore, a particular orbit shape may be utilized to compensate for one or more environmental factors (e.g., wind, avoiding detection, evading enemy attacks) while attempting to recover an air vehicle. For example, the drogue recovery orbit may be generally elliptical. In other embodiments, the altitude of the drogue may be intentionally varied while in the drogue recovery orbit to facilitate recovery of an air vehicle.

Establishment of the drogue in a drogue recovery orbit may be achieved in various embodiments by establishing a mothership, which is towing the drogue, in a mothership recovery orbit. As used herein, a "mothership recovery orbit" refers to an orbit in which the mothership is established to facilitate recovery of an air vehicle. Similar to the drogue recovery orbit discussed above, the mothership recovery orbit may be an orbit in which the mothership maintains substantially the same altitude while flying in a generally circular pattern. In other embodiments, the mothership recovery orbit may have patterns that are not circular. Thus, any shape orbit may be utilized to facilitate recovery of an air vehicle. Furthermore, a particular orbit shape may be utilized to compensate for one or more environmental factors (e.g., wind, avoiding detection, evading enemy attacks) while attempting to recover an air vehicle. For example, the mothership recovery orbit may be generally elliptical. In other embodiments, the altitude of the mothership may be intentionally varied while in the mothership recovery orbit to facilitate recovery of an air vehicle.

In other embodiments, establishment of the drogue in a drogue recovery orbit may be achieved by actuating one or more control surfaces of the drogue. These control surfaces may be any type of control surface used in aviation to control the flight path and characteristics of an air vehicle. Examples of control surfaces that may be actuated to establish the drogue in a drogue recovery orbit can be seen below in connection with the discussion of FIGS. 3-5.

In various embodiments, the drogue recovery orbit may have a radius greater than a minimum turning radius of the air vehicle to be recovered. During recovery, the drogue may be controlled to have an airspeed that is less than the airspeed of the air vehicle to be recovered. In various embodiments, the airspeed of the air vehicle is a nominal airspeed, and the airspeed of the drogue is less than the nominal airspeed of the air vehicle to be recovered.

At block 102, an air vehicle is recovered with the drogue. In various embodiments, recovery of the air vehicle includes maneuvering the drogue and the air vehicle in a cooperative manner to facilitate recovery of the air vehicle. This maneuvering in a cooperative manner may include, for example, controlling both the drogue and air vehicle to move towards a common point or to reduce the relative distance between the drogue and the air vehicle to facilitate recovery.

In various embodiments, recovery of the air vehicle includes utilizing a homing device on the drogue to guide the air vehicle. The homing device may be active, passive, or have components that are both active and passive. Examples of passive homing devices include a color marker, an infrared marker, an acoustic beacon, and an electromagnetic beacon. In various embodiments, the air vehicle may use vision-based sensors, for example, to maintain a constant image of the target (e.g., a capture mechanism associated with the drogue) during the final stage of recovery. If the image "moves" while the air vehicle is approaching the drogue, the air vehicle may actuate its control surface(s) to reacquire the desired approach image by the vision-based sensors. It is worth noting that other sensor systems may be used.

At any stage of the method shown in FIG. 1, it may be advantageous to compensate for wind, which may cause the drogue recovery orbit to become "tilted." A "tilt" refers to a situation in which the drogue experiences unintentional altitude variations while in the drogue recovery orbit. These altitude variations may be caused by the wind.

Compensation for the wind may be achieved by using several different techniques, alone or in combination. For example, as discussed above, the mothership recovery orbit may be "tilted" in one embodiment by varying the altitude of the mothership during the mothership recovery orbit. Also, the shape of the mothership recovery orbit (e.g., circular, elliptical, etc.) may be varied to compensate for wind. In other embodiments, the orbit of the air vehicle may be "tilted" by varying the altitude of the air vehicle as recovery of the air vehicle is attempted. In another embodiment, a winch may be used to deploy the tow cable (e.g., from the mothership) that is connected to the drogue, and thus, the winch may be used to vary the length of the tow cable to compensate for the effect of the wind on the drogue. In various embodiments, one or more of the control surfaces of the drogue may be actuated to control the flight path of the drogue to compensate for wind.

Figure 2:
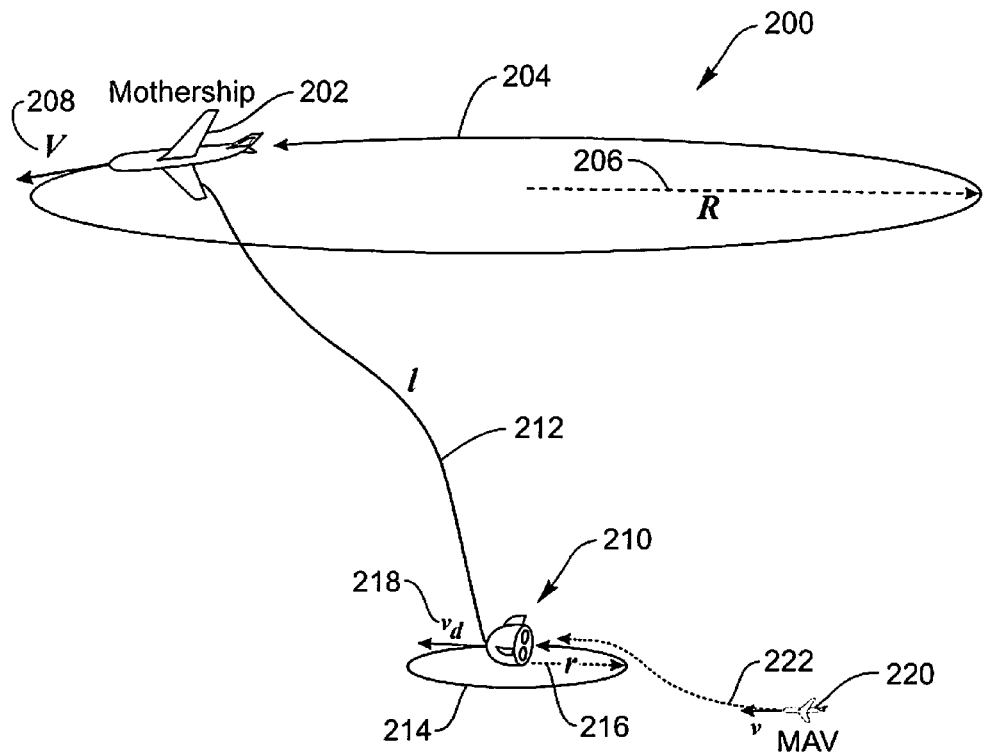
FIG. 2 is a diagram illustrating an embodiment of a system that may be used to recover an air vehicle.

Referring now to FIG. 2, system 200 is shown that may be used to recover an air vehicle. System 200 includes mothership 202 that is shown flying in mothership recovery orbit 204. Mothership 202 may be manned or unmanned. Mothership recovery orbit 204 has radius (R) 206, and mothership 202 is traveling at speed (V) 208. Drogue 210 is coupled to mothership 202 by tow cable 212, which has length (I) 212.

Drogue 210 is flying in drogue recovery orbit 214. Drogue recovery orbit 214 has radius (r) 216. In various embodiments, radius 216 of drogue recovery orbit 214 is significantly smaller than radius 206 of mothership recovery orbit 204. Drogue 210 is shown traveling at speed ($v_d$) 218. In various embodiments, speed 218 of drogue 210 is significantly less than speed 208 of mothership 202.

Air vehicle 220 (e.g., MAV) is shown flying towards drogue recovery orbit 214 in order to be recovered by drogue 210. Air vehicle 220 is shown flying at speed (v) 222. As discussed above, speed 218 of drogue 210 is less than speed 222 of air vehicle 220 so that air vehicle 220 may over take drogue 210 once air vehicle 220 has entered drogue recovery orbit 214.

Figure 3:
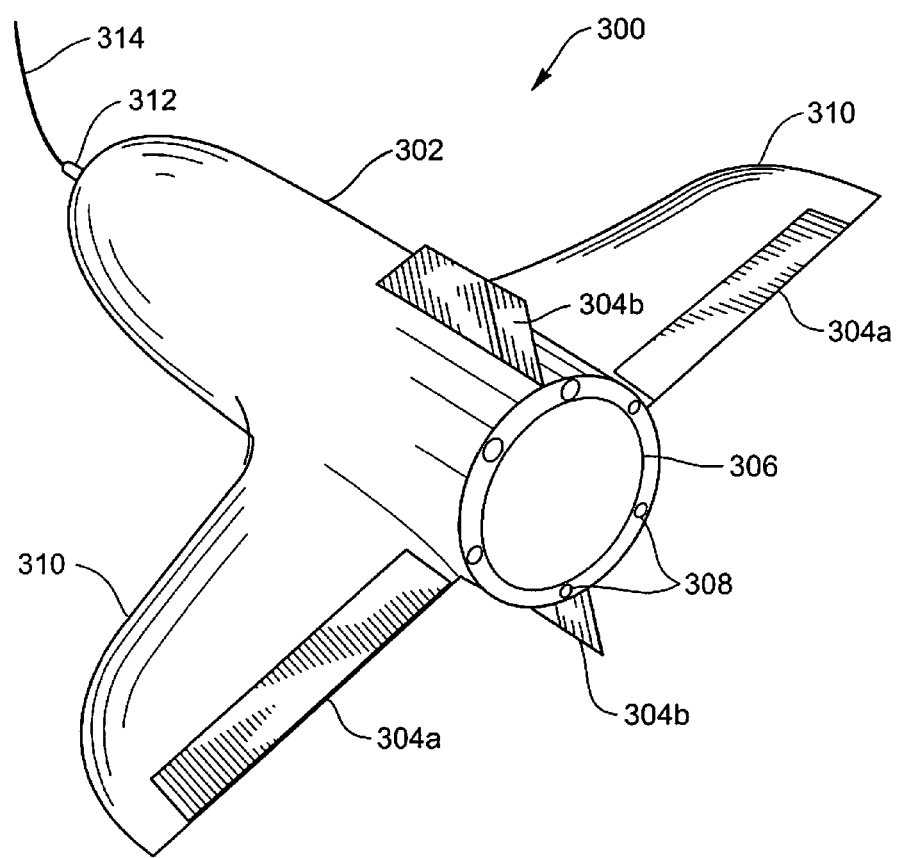
FIG. 3 is a diagram illustrating one embodiment of a drogue that may be used to recover an air vehicle.

Referring now to FIG. 3, one embodiment of a drogue is shown. Drogue 300 includes aerodynamic main body portion 302 and control surfaces 304 located on main body portion 302. Control surfaces 304 include elevons 304a. Elevons are a combination of elevators and ailerons. Control surfaces 304 also include rudders 304b. It is worth noting that other numbers, types, and configurations of control surfaces may be used.

Drogue 300 additionally includes catch mechanism 306 coupled to main body portion 302. Catch mechanism 306 is an open cavity located within an interior of main body portion 302 and is designed to facilitate recovery of an air vehicle. In various embodiments, catch mechanism 306 is lined with one type of hook-and-loop fastening material, and the air vehicle to be recovered has a complementary type of hook-and-loop fastening material disposed thereon to facilitate recovery. Although, other material could be used to line catch mechanism 306 to facilitate recovery of an air vehicle.

Drogue 300 also includes homing device 308 coupled to main body portion 302 to guide the air vehicle during recovery. As mentioned above, homing device 308 may be active, passive, or have components that are both active and passive. Examples of passive homing devices include a color marker, an infrared marker, an acoustic beacon, and an electromagnetic beacon.

Drogue 300 has wings 310 coupled to main body portion 302. Wings 310 are designed to impart lift to drogue 300 while in flight. Attachment mechanism 312 is coupled to the front of main body portion 302 and is designed to attach main body portion 302 to a mothership with tow cable 314.

Figure 4:
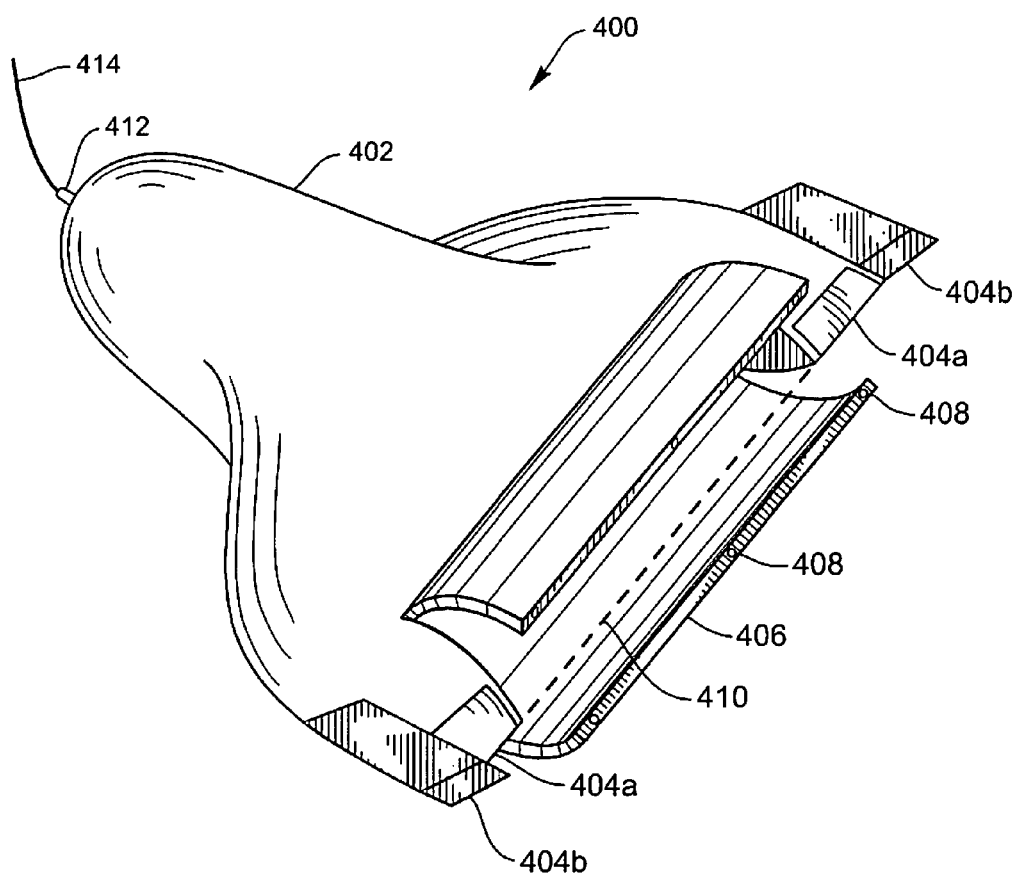
FIG. 4 is a diagram illustrating another embodiment of a drogue that may be used to recover an air vehicle.

Referring now to FIG. 4, another embodiment of a drogue is shown. Drogue 400 includes aerodynamic main body portion 402, which is designed to create lift while flying. The shape of main body portion 402 may be similar to that of stealth aircraft that have a "flying wing" design. Drogue 400 also includes control surfaces 404 located on main body portion 402. Control surfaces 404 include elevons 404a. Control surfaces 404 also include rudders 404b. It is worth noting that other numbers, types, and configurations of control surfaces may be used.

Drogue 400 additionally includes catch mechanism 406 coupled to main body portion 402. Catch mechanism 406 is a closeable cavity located within the interior of main body portion 402 and is designed to facilitate recovery of an air vehicle. As shown in FIG. 4, catch mechanism 406 is illustrated in an open configuration, ready to recover an air vehicle. The dashed line in FIG. 4 indicates trailing edge 410 of main body portion 402 when catch mechanism 406 is in a closed configuration. In various embodiments, catch mechanism 406 is lined with one type of hook-and-loop fastening material, and the air vehicle to be recovered has a complementary type of hook-and-loop fastening material disposed thereon to facilitate recovery. Although, other material could be used to line catch mechanism 406 to facilitate recovery of an air vehicle.

Drogue 400 also includes homing device 408 coupled to main body portion 402 to guide the air vehicle during recovery. As mentioned above, homing device 408 may be active, passive, or have components that are both active and passive. Examples of passive homing devices include a color marker, an infrared marker, an acoustic beacon, and an electromagnetic beacon. Attachment mechanism 412 is coupled to the front of main body portion 402 and is designed to attach main body portion 402 to a mothership with tow cable 414.

Figure 5:
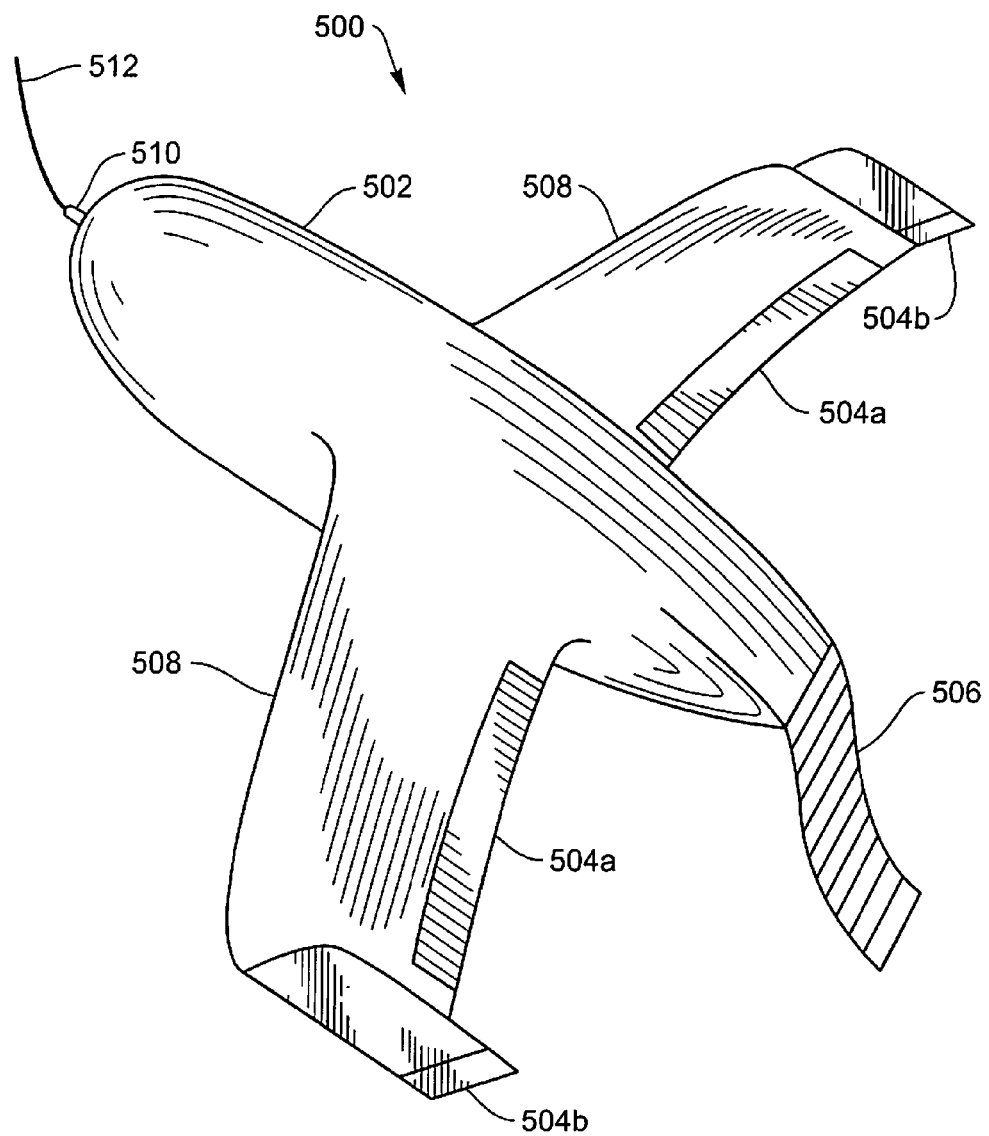
FIG. 5 is a diagram illustrating yet another embodiment of a drogue that may be used to recover an air vehicle.

Referring now to FIG. 5, another embodiment of a drogue is shown. Drogue 500 includes aerodynamic main body portion 502 and control surfaces 504 located on main body portion 502. Control surfaces 504 include elevons 504a. Control surfaces 504 also include rudders 504b. It is worth noting that other numbers, types, and configurations of control surfaces may be used.

Drogue 500 additionally includes catch mechanism 506 coupled to main body portion 502. Catch mechanism 506 is a dragnet coupled to main body portion 502 and is designed to facilitate recovery of an air vehicle. In various embodiments, catch mechanism 506 is lined with one type of hook-and-loop fastening material, and the air vehicle to be recovered has a complementary type of hook-and-loop fastening material disposed thereon to facilitate recovery. Although, other material could be used to line catch mechanism 506 to facilitate recovery of an air vehicle.

Drogue 500 has wings 508 coupled to main body portion 502. Wings 508 are designed to impart lift to drogue 500 while in flight. Attachment mechanism 510 is coupled to the front of main body portion 502 and is designed to attach main body portion 502 to a mothership with tow cable 512.

Although not shown in the figures, the drogue may have an autopilot system that is capable of actuating the one or more control surfaces in order to establish and maintain a drogue recovery orbit. In addition, the drogue and the air vehicle may each have a Global Positioning System ("GPS") receiver that can provide information that can be used to bring the drogue and the air vehicle within 3-5 meters of each other, at which point the air vehicle may utilize the homing device on the drogue for guidance during the final stage of recovery. The autopilot of the drogue may also be used to cooperatively maneuver the drogue during the final stage of recovery of the air vehicle.

In operation, each component of the system (e.g., mothership, drogue, air vehicle) may be controlled by software. In various embodiments, control software may be resident on each component, respectively (e.g., control software for mothership may be resident on the mothership). In other embodiments, the control software for all of the components may be resident in one location (e.g., mothership or on a remote computer system). In still other embodiments, the location of the control software may be a combination of these examples.

Regardless of the location of the control software, there may be a user interface in various embodiments for a user to control the overall system (e.g., programming one or more of the components, inputting environmental factors that need to be considered for recovery of an air vehicle, manually controlling one or more components, etc). In one embodiment, the user interface may be a laptop computer. In other embodiments, the user interface may be a desktop computer, a personal digital assistant, a tablet personal computer ("PC"), or other similar devices. The user interface may be physically connected to one or more of the system components. In other embodiments, the user interface may be in wireless communication with one or more of the system components.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed embodiments.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method comprising:
    establishing a mothership in a mothership recovery orbit, wherein the mothership maintains substantially the same altitude while flying in a generally circular horizontal pattern, the mothership recovery orbit having a first radius;
    establishing a drogue deployed from and being towed by the mothership in a drogue recovery orbit, wherein the drogue maintains substantially the same altitude while flying in a generally circular horizontal pattern, the drogue recovery orbit having a second radius that is significantly smaller than the first radius of the mothership recovery orbit, wherein the mothership is traveling at a faster speed than the drogue, and wherein establishing the drogue in the drogue recovery orbit comprises actuating one or more control surfaces of the drogue; and
    recovering an air vehicle with the drogue.

2. The method of claim 1, wherein the drogue recovery orbit has a radius greater than a minimum turning radius of the air vehicle, and wherein the drogue has an airspeed that is less than an airspeed of the air vehicle.

3. The method of claim 1, wherein recovering the air vehicle comprises:
    maneuvering the drogue and the air vehicle in a cooperative manner to facilitate recovery of the air vehicle.

4. The method of claim 1, wherein recovering the air vehicle comprises:
    utilizing a homing device on the drogue to guide the air vehicle.

5. The method of claim 1, further comprising:
    compensating for wind.

* * * * *